Figures 1, 5, 6, 7:
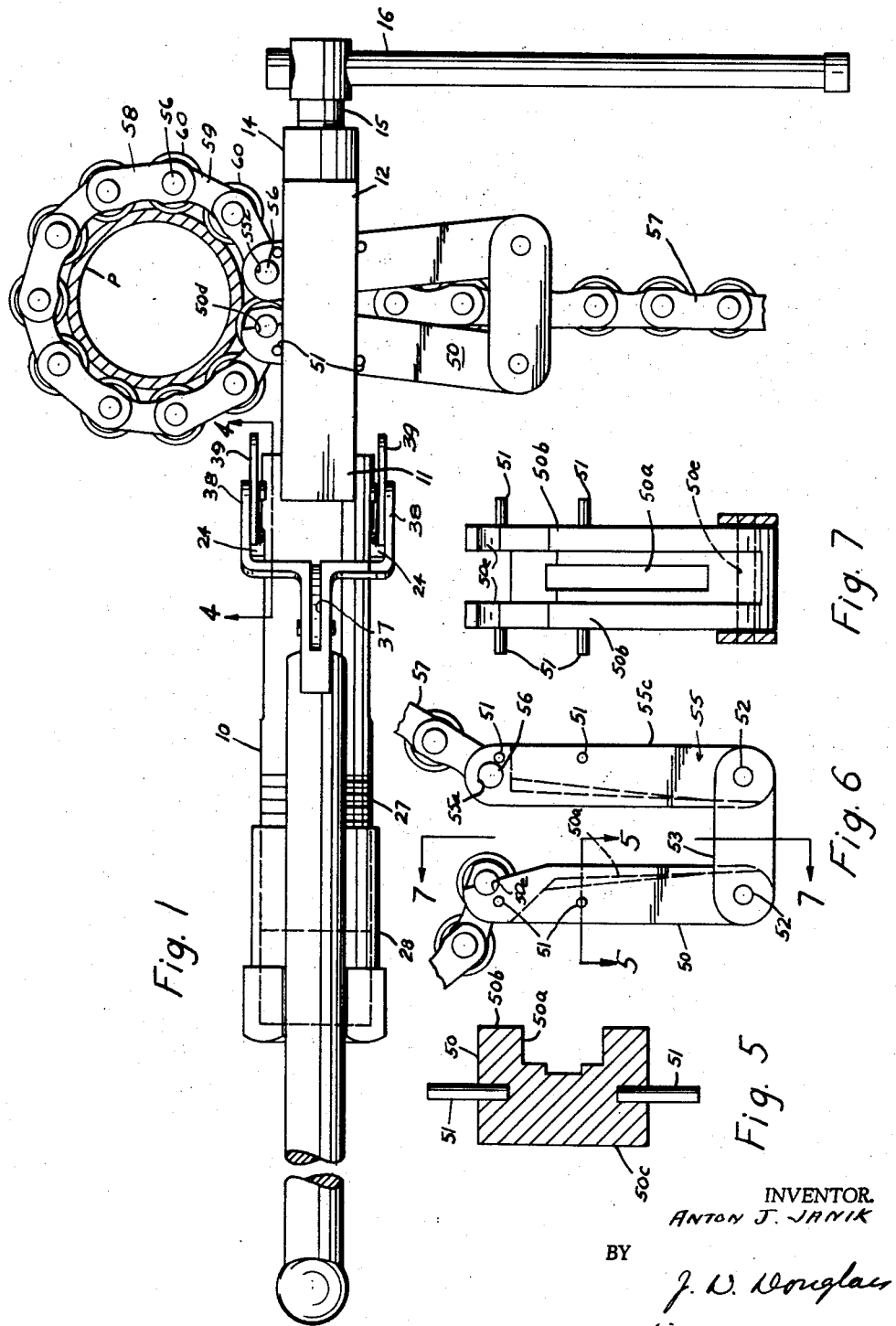

June 8, 1965

A. J. JANIK 3,187,969

CHAIN TYPE PIPE BREAKER

Filed Aug. 18, 1961

2 Sheets-Sheet 1

INVENTOR.
ANTON J. JANIK

BY
J. D. Douglas

HIS ATTORNEY

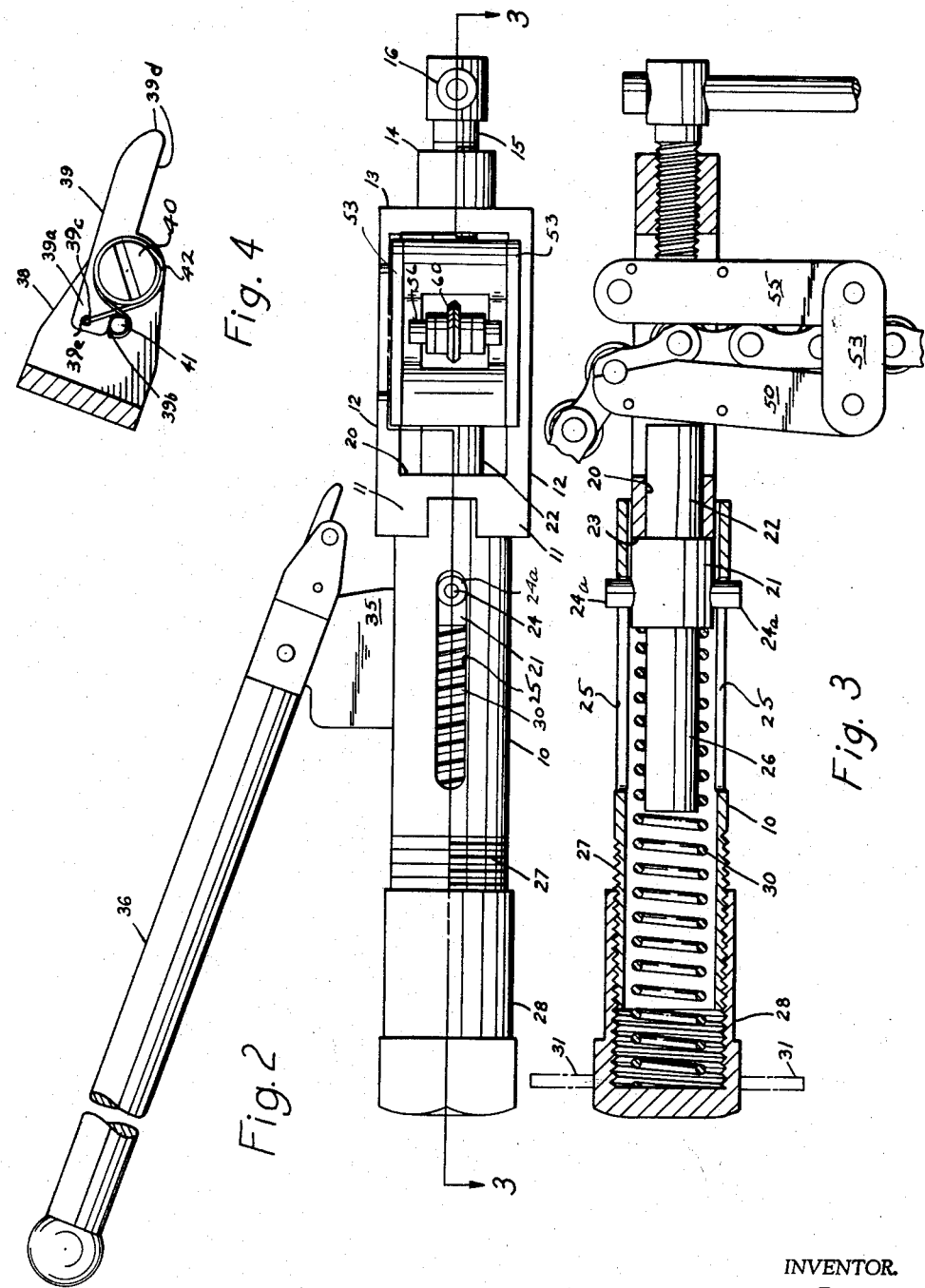

United States Patent Office 3,187,969
Patented June 8, 1965

3,187,969
CHAIN TYPE PIPE BREAKER
Anton J. Janik, Elyria, Ohio, assignor to The Ridge Tool Company, Elyria, Ohio, a corporation of Ohio
Filed Aug. 18, 1961, Ser. No. 132,380
6 Claims. (Cl. 225—103)

This invention relates to a method and apparatus for fracturing or breaking frangible pipe.

Heretofore it has been necessary in the installation of certain types of pipe to cut or break the pipe in order to complete the assembly of a pipe line where a short piece of pipe is needed for the completion of such a line. The types of product used to make such pipe line include ordinary tile pipe, cast iron pipe, and many others which are of a frangible nature. In connection with ordinary soil pipe, which is usually made of cast iron, it was customary to break it by using a cold chisel and hammer and working around the pipe, striking many blows until the pipe parted. This was time-consuming, required a considerable amount of skill and frequently resulted in a break that provided highly irregular projections on the end surface that had an adverse effect on its subsequent seal with the bell of the pipe to which it was joined. Although the pipe could be sawed by a hack saw or a power saw, the hack saw required an extremely long time to sever the pipe and a large amount of labor. The power saw was dangerous.

All of the above methods were nearly impossible to perform when it was desired to sever a pipe that had been previously installed, when it was desired to get into the line for some reason or other.

Clay pipe, of course, could not be cut by a hack saw and therefore there was left only the use of a hammer and chisel or a power saw with a diamond embedded blade. Tile pipe and many of the other pipes, made of composition, such as the so-called "Transite" type of pipes, were extremely difficult to break with a chisel and to provide a reasonably uniform end without cracks or deeply gouged out parts.

By the present invention I am able to cut any of the previously mentioned pipes quickly, easily and efficiently. A great advantage resides in the fact that a person with a minimum of skill may use the apparatus and break the pipe in a highly efficient and satisfactory manner without wasting the pipe by causing it to break at a place where it was not intended to be broken.

Briefly, the invention contemplates placing a chain of breaker members or a breaker element around the pipe and tightening the same in place to exert a constant steady and non-breaking pressure on the pipe. Then the breaking member or members are subjected to a sudden, quick, high-force shock which causes the breaker members or member to penetrate the pipe at points spaced around the pipe substantially simultaneously and which causes the pipe to separate quickly and with very smooth regular ends.

The shock excitation of the breaker member or members is such that the weight inertia of the pipe itself assists in providing a clean break because the breakers penetrate the pipe in an extremely narrow circumferential zone and the inertia mass of the material at either side of the breaking line deters the pipe from breaking anywhere except on the desired line.

The mechanism for accomplishing the foregoing includes a first means for tightening the breaker member with the breakers under constant pressure against the pipe. Then the second means is brought into action to provide a sudden impact to one side of the tightening means, which impact is transmitted substantially simultaneously to all the breaking members or member circumferentially around the pipe in a very narrow circumferential line. The tightening means also holds one end of the breaking means against movement so that the movement starts at the end most removed therefrom and travels around the pipe in a circumferential direction albeit that movement is substantially instantaneous.

The method and the apparatus and other advantages of the invention will become more apparent from the following description of an embodiment thereof which description is illustrated by the accompanying drawings and forms a part of the specification.

In the drawings:

FIG. 1 is an elevational view of the invention;
FIG. 2 is a plan view of the invention;
FIG. 3 is a fragmentary section taken on the line 3—3 of FIG. 2;
FIG. 4 is an enlarged elevational view of a latch;
FIG. 5 is a section taken from the line 5—5 of FIG. 6;
FIG. 6 is an elevational view of the clamp jaws removed from the frame; and
FIG. 7 is a view taken from the line 7—7 of FIG. 6.

A tubular barrel 10 is provided, and at one end has a closed rectangular yoke. One end 11 of the yoke is set into or welded onto the end of the barrel. The sides 12 of the yoke extend outwardly from the end of the barrel to provide an open rectangular frame. The extremity 13 bridges the sides 12 and is formed with an internally threaded boss 14. A clamp screw 15 is threaded through the boss and extends into the interior of the yoke substantially coaxial with the axis of the barrel 10. A handle 16 is provided for the end of the screw 15, whereby it may be rotated. The end 11 of the yoke is formed with an aperture 20 which may be circular and is also coaxial with the axis of the barrel.

An impact piston or plunger is reciprocably mounted in the barrel and comprises a heavy body 21 of cylindrical formation of a size to provide a free sliding fit with the interior of the barrel. It is provided with an impact head 22 which is slightly smaller than the body and of a length to extend through the aperture 20 into the interior of the yoke. The shoulder 23 formed at the junction of the body 21 and head 22 provides a stop for the plunger, limiting its movement into the yoke. The length of the head 22, as well as the diameter, may be varied. Preferably, however, it should extend into the yoke sufficiently far that during operation it may deliver its impact freely prior to the bottoming of the shoulder 23 with the end of the yoke which is presented to the interior of the barrel.

It is pointed out that if desired the end of the barrel could be made closed except for an aperture for the passage of the head 22, and the yoke could be merely parallel side pieces 12 with a bridge 13, the legs 12 being welded to the sides of the barrel.

The impact member is provided with a pair of retractor pins 24 projecting through guide slots 25 extending longitudinally of the barrel and extending outwardly from diametrically opposite sides of the barrel. It is also provided with a coaxial stem 26 which extends coaxially in the barrel 10 toward the free end.

The end of the barrel is provided with an external thread 27 and an internally threaded cap 28 is adjustably threaded on the end of the barrel.

A heavy helical spring 30 is disposed inside of the barrel with one end adjustably engaged with the inner end surface of the cap, extending lengthwise inside the barrel around the stem 26 and with the other end compressively engaged with the end of the body 21 of the impact head. Thus the impact member is held with the shoulder 23 seated against the wall at the end of the barrel and with the head 22 projecting into the interior of the yoke.

The cap 28 may be adjusted on the end of the barrel to adjust the compression of the spring 30 and the amount of pressure exerted by it under static conditions. The cap is shown provided with a hexagonal outer surface for engagement by a wrench to enable its adjustment. It is within the purview of the invention, however, that it also could be provided with outwardly extending handles, shown in dotted lines at 31, eliminating the need for a wrench should it be desired. Furthermore, the end of the barrel could be internally threaded and a plug provided having a suitable socket in the end for engagement by a wrench should it be desired.

Means is provided for moving the impact member backward toward the end of the barrel against the resistance of the spring 30 to store up energy in the spring and then to release the impact member, whereby it is driven forcibly toward the yoke and with the impact head 22 driven through the opening 20 in the yoke to strike a sudden blow on the breaker mechanism.

On one side of the barrel, as viewed in FIG. 1, and on the top as viewed in FIG. 2, an operating handle supporting boss 35 is formed in the side of the barrel near the yoke end. The boss is provided with an aperture and an operating handle 36, which is slotted at 37 on the lower end, is pivotally secured on the boss. The operating handle is provided with a pair of arms 38 which are spaced apart greater than the diameter of the barrel 10 and each of which is provided with an operating dog 39 pivotally secured to the inner face of each arm by a shouldered cap screw 40.

As can be seen from FIG. 4, each dog has an enlarged portion 39a having a shoulder 39b which engages with a stop pin 41. A spring 42 has one end hooked around the pin 41 and is then coiled around the pivot screw 40 with the other end hooked in an aperture 39c in the base 39e. The spring thus holds the dog in its extended position but it may pivot clockwise, as viewed in FIG. 4, about the pivot 40. The end 39d of the dog is rounded.

When the handle 36 is moved clockwise, as viewed in FIG. 2, the straight surface 39e of the dog engages with the pins 24 which are each provided with a roller 24a. Continued movement of the handle causes the impact member to be moved in the cylinder against the pressure of the spring 30, compressing the spring and storing up energy therein until the dogs 39 slip off the sides of the rollers 24a and the impact member is thus released. At this time the spring forces the member to the right and by the time it has reached the end of its travel it has reached a high velocity which is maximum at the time when the impact head 22 passes through the opening 20. At this time it strikes the breaker operating mechanism a very severe blow. The dogs are now on the opposite side to their starting side of the retractor pins 24 and when the handle is rotated counterclockwise, the dogs hinge about the pins 41 against the pressure of the springs 42 and the rollers 24a roll over the surface 39e of the dogs and the handle is now ready for a repetition of the action.

The above action enables a number of repeated blows to be struck should the occasion be necessary. I have found, however, that with a properly weighted head and a sufficiently strong spring, one blow usually suffices for the purpose.

The breaker mechanism per se comprises a link chain having circular disc cutters at the pivots for the links. The chain is wrapped around the pipe to be cut and then tightened in position with a clamping mechanism which is carried by the yoke, and, after being tightened the desired amount, may be struck to shock the same into its breaking action.

The clamp mechanism comprises a first clamp member 50 which is of generally rectangular cross section and extends through the yoke in close proximity to the side members 12 opposite the end 11 of the yoke and opposite to the aperture 20. From the upper end, as viewed in FIG. 1, but spaced from the other or lower end, the member 50 is provided with a channel 50a, FIG. 5. This leaves side walls 50b and a back wall 50c which is disposed adjacent to the aperture 20. The upper ends of the side walls are notched at 50e, the purpose of which is to provide seats for the pivot pins of the chain breaker member.

The member is held in position in the yoke by pairs of pins 51 which extend from the side walls 50g of the clamp member 50 on opposite sides of the yoke sides 12. Although four such pins are provided, only two are needed to hold the clamp member in position.

The lower end of the clamp member is provided with a pivot pin bore 50e for receiving a link pin 52 by means of which a pair of links 53 are pivotally secured on opposite sides.

The other clamp member 55 is similar to the first clamp member except that the upper end is not notched, merely being provided with pin receiving opening 55a for holding the end pin 56 of the chain 57. It likewise has pins 51 for holding it in position between the side members 12 of the yoke and the lower end is connected by a pivot pin 52 to the links 53. The back 55c is disposed opposite to the end of the screw 15.

It will later be seen that the clamp member 50 bottoms against the end of the yoke opposite to the aperture 20 and the other member 55 may be moved toward the first member to tighten the chain about the pipe.

The chain 57 has an end link secured in the opening 55a of the clamp member 55 by a pin 56. It may be of conventional construction including the widely spaced side links 58 which are spaced on either side of the narrow links 59 and held connected thereto by pins 56 which extend well beyond the sides of the links. The links at each of the pins have journalled on each of the pins between the inner narrow links, cutter or breaker wheels 60. The cutter wheels are provided with relatively sharp edges which have an included angle of about 60°. It is pointed out, however, that this included angle and the shape of the blades may be varied. Although I have shown the breakers as wheels it will be appreciated that they could be in the form of generally rectangular chisels having a curved cutting edge of general concave configuration to conform to the pipe.

Although the clamp member shown is of the preferred type because of the economy of construction, it will be appreciated that other means could be substituted. For instance, the first clamp member could be merely a block mounted on ways in the frame and the second clamp, a similar block mounted on the same ways. The upper ends of the block could be arranged one to be pinned to one end of the chain and the other to hook onto the pins of the chain the same as in the clamp member.

The chain breaker is passed around the pipe, shown at P, when the jaws are opened up by unscrewing the screw 15, and tightened around the pipe by hand and one of the pins 56 is engaged in the notches 50d. At this time the free end of the chain passes down between the clamp 50–55 and beyond the links 53. After the slack in the chain has been taken up as much as possible by hand, the screw 15 is turned which moves the second clamp member 55 toward the first clamp member 50. This causes the chain, with its breakers, to be securely tightened around the pipe, with the breaking edges of the breakers in tangential engagement with the pipe. Obviously, if the concave chisels are used, the engagement would be circumferential and not tangential.

The tightening is preferably continued until the first clamp member 50 moves against the impact head 22 causing the impact breaker to be forced against the pressure of the spring 30 until the outer end of the head is flush with the exit of the opening 20. The pipe is now ready to be broken.

The operator then grasps the handle 36 and moves it clockwise. The dogs 39 engage with the rollers 24a on the retractor pins 24 and the impact member is moved toward the end of the cylinder 10, compressing the spring 30, and storing up energy therein. Continued movement of the handle causes the dogs to pass over the rollers 24a, at which time the impact member is released and the spring 30 forcibly moves it toward the right.

The impact head passes through the aperture 20, at which time it has attained its greatest velocity, and hits the first clamp member 50 a severe blow. This causes the member to pivot about the pin 52 and the end of the chain, where it is seated in the notches 50d, is then suddenly jerked with an extremely high and sudden blow. This causes all the breakers to be forced inward radially around the periphery of the pipe, causing the same to be suddenly fractured and broken off.

It will be noted that the fixed end of the chain, which is attached to the second clamp member 55, cannot move and does not move until the pipe has been fractured.

It should be pointed out that although an impact mechanism has been illustrated which comprises a spring pressed plunger it is within the purview of the invention to substitute other types of plungers which would be equally effective. One such type includes a plunger tube of non-magnetic material in which is disposed a plunger of magnetic material and the outside of the tube is provided with a winding which, when energized with a high current, causes the plunger to travel in the tube into impact with the pipe breaking support mechanism.

Still another mechanism contemplates a breech into which an explosive cartridge may be inserted and which when fired drives the plunger along the barrel into engagement with the breaker support lever.

Having thus described my invention in an embodiment thereof I am aware that numerous and extensive departures may be made therefrom without departing from the spirit of the invention as defined by the appended claims.

I claim:

1. An apparatus for fracturing frangible pipe by subjecting said pipe to sudden simultaneous pressures about its periphery in a sharply defined line which comprises support means disposed around the pipe and supporting sharp wedge-shaped edges for engagement with the pipe on a substantially circumferential line, means connected to said pipe surrounding means to impart and maintain an initial steady compression force to force said wedge-shaped edges against the pipe, impact means carried by said compression means and movable with respect to and engageable with said support means and arranged to supply a sudden impact thereto.

2. An apparatus as described in claim 1, wherein the impact means is arranged to supply an impact to one end of said pipe surrounding means and the other end is held against movement.

3. An apparatus of the class described comprising a frame, an impact mechanism connected to one end of the frame and including an impact member having an impact head movable through the frame into the interior, a breaker support mechanism, breaker means supported by said breaker support mechanism, said breaker support mechanism including a breaker connecting and tightening means disposed in said frame and having said breaker means connected thereto, means connected with said breaker connecting means to operate said breaker connecting and tightening means to tighten and maintain the breaker means about the pipe and to force said breaker connecting and tightening means into position for impact by said impact means, said impact means being movable with respect to said breaker connecting and tightening means, and means to operate said impact means to cause it to deliver a sudden blow to said breaker connecting and tightening means.

4. An apparatus for fracturing frangible pipe comprising a frame, an impact delivering means secured to one end of the frame and including an impact member having an impact head adapted to be extended through an opening in the frame to the interior thereof, a pipe breaking member support means extending through the frame and including a first lever member disposed opposite to said opening and arranged to be struck by said impact head, a second lever member disposed in spaced relation to the first member at the other end of the frame, adjustable means carried by the frame and extending into the frame and engaged with said second lever member to adjustably move said second lever member toward the first lever member, means for surrounding the pipe having pipe breaking members thereon, one end of said means being connected to said second lever member and means for connecting said pipe surrounding means at spaced points from its ends to said first lever member, said impact member being movable with respect to said pipe breaking member support means and means to operate said impact member to cause the impact means to engage said pipe breaking member support means to cause said pipe breaking members to be suddenly driven into pipe breaking engagement with the pipe.

5. An apparatus as described in claim 4, wherein said impact means comprises a cylinder and said impact head is reciprocably mounted in the cylinder.

6. An apparatus for fracturing frangible pipe comprising a frame, an impact delivering means secured to one end of the frame and including an impact member having an impact head adapted to be extended through an opening in the frame to the interior thereof, a pipe breaking member support means extending through the frame and including a first lever member disposed opposite to said opening and arranged to be struck by said impact head, a second lever member disposed in spaced relation to the first member at the other end of the frame, adjustable means carried by the frame and extending into the frame and engaged with said second lever member to adjustably move said second lever member toward the first lever member, means for surrounding the pipe having pipe breaking members thereon, one end of said means being connected to said second lever member and means for connecting said pipe surrounding means at spaced points from its ends to said first lever member, and means to operate said impact member to cause said pipe breaking members to be suddenly driven into pipe breaking engagement with the pipe, said impact head operating means being a spring and said cylinder being formed with a pair of slots and said impact head having pins mounted thereon and extending outwardly through the slots, a lever being pivotally mounted on the cylinder and having releasable fingers for engagement with said pins to engage said pins and to move said head in a direction to compress the spring.

References Cited by the Examiner

UNITED STATES PATENTS

| 1,366,063 | 1/21 | Culhane | 225—2 |
| 2,249,325 | 7/41 | Pruckner | 225—96 |
| 2,526,362 | 10/50 | Johnston | 225—96 |
| 2,793,433 | 5/57 | Wheeler | 225—103 |
| 2,800,868 | 7/57 | Temple | 60—26.1 |
| 2,862,295 | 12/58 | Harding et al. | 225—103 |
| 2,949,669 | 8/60 | Wheeler | 225—103 |
| 3,048,920 | 8/62 | Wheeler | 225—103 |

FOREIGN PATENTS

| 594,661 | 3/60 | Canada. |

ANDREW R. JUHASZ, *Primary Examiner.*

RAPHAEL M. LUPO, *Examiner.*